United States Patent [19]

Slutz et al.

[11] Patent Number: 5,211,726

[45] Date of Patent: * May 18, 1993

[54] PRODUCTS AND PROCESS FOR MAKING MULTIGRAIN ABRASIVE COMPACTS

[75] Inventors: David E. Slutz, Columbus; Francis R. Corrigan, Westerville, both of Ohio

[73] Assignee: General Electric Company, Worthington, Ohio

[*] Notice: The portion of the term of this patent subsequent to Apr. 21, 2009 has been disclaimed.

[21] Appl. No.: 669,259

[22] Filed: Mar. 14, 1991

[51] Int. Cl.⁵ .............................................. B24D 3/00
[52] U.S. Cl. ........................................ 51/293; 51/295; 51/309
[58] Field of Search ..................... 51/293, 295, 309

[56] References Cited

U.S. PATENT DOCUMENTS

| | | | |
|---|---|---|---|
| 2,210,039 | 8/1940 | Petrie | 51/280 |
| 3,239,321 | 3/1956 | Blainey et al. | 51/309 |
| 3,372,010 | 6/1965 | Parsons | 51/309 |
| 3,999,962 | 12/1976 | Drui et al. | 51/307 |
| 4,142,872 | 3/1979 | Conradi | 51/309 |
| 4,311,490 | 1/1982 | Bovenkerk | 51/293 |
| 4,399,167 | 8/1983 | Pipkin | 427/217 |
| 4,441,894 | 4/1984 | Sarin et al. | 51/293 |
| 4,671,021 | 6/1987 | Takahashi et al. | 51/293 |
| 4,673,414 | 6/1987 | Lavens et al. | 51/293 |
| 4,690,691 | 9/1987 | Komanduri | 51/295 |
| 4,738,689 | 4/1988 | Gigl et al. | 51/295 |
| 4,919,974 | 4/1990 | McCune et al. | 51/293 |
| 5,011,514 | 4/1991 | Cho et al. | 51/295 |

*Primary Examiner*—Mark L. Bell
*Assistant Examiner*—Willie J. Thompson
*Attorney, Agent, or Firm*—Millen, White, Zelano & Branigan

[57] ABSTRACT

Multigrain abrasive compacts and processes for making the same are provided which comprise fine granules of cubic boron nitride or diamond bound by a sintered matrix derived from a coating on the granules. The coating comprises one or more layers of an active coating material which chemically bonds to the underlying surface. These compacts are obtained by coating fine granules of cubic boron nitride or diamond with the active coating material and sintering the coated particles with or without a powdered metal or alloy. The compacts can be obtained utilizing a short sintering step with relatively low pressures and temperatures. In certain embodiments, the use of high pressure, high temperature equipment can be voided. These compacts have improved breakdown characteristics due to the nature of the coated particles incorporated therein. The process provided is well suited for the use of diamond powder obtained from chemical vapor deposition processes.

20 Claims, No Drawings

PRODUCTS AND PROCESS FOR MAKING MULTIGRAIN ABRASIVE COMPACTS

CROSS-REFERENCE TO RELATED APPLICATIONS

This application is related to the invention described in copending U.S. patent application Ser. No. 07/669124 now U.S. Pat. No. 5,106,392, entitled "Multigrain Abrasive Particles", filed concurrently herewith and assigned to the same assignee as the present invention.

BACKGROUND OF THE INVENTION

This invention relates to multigrain compacts of diamond or cubic boron nitride particles bonded by a sintered matrix material.

A compact is a mass of abrasive particles that is bonded together in a self bonded relationship as described in U.S. Pat. Nos. 3,852,078 and 3,876,751; by means of a bonding medium, as described in U.S. Pat. Nos. 3,136,615, 3,233,988, 3,743,489, 3,767,371 and 3,918,931 or by means of some combination thereof. The abrasive particles used can have single grain (monocrystalline) or multigrain (polycrystalline) crystal structure. Monocrystalline particles are formed with the aid of a catalyst while polycrystalline particles are obtained by direct conversion of a compound having an alternate crystal structure such as hexagonal boron nitride and graphite. Representative of these compacts are U.S. Pat. Nos. 2,367,404, 3,650,714, 3,957,461, 3,929,432, 3,984,214, 4,224,380, 4,288,248 and 4,738,689.

Compacts of cubic boron nitride can be formed simultaneously with the conversion of hexagonal boron nitride to cubic boron nitride. This can be done with or without the aid of a catalyst metal or alloy. One example of a method which does not require a catalyst is described in copending U.S. patent application Ser. No. 07/365,883, filed Jun. 14, 1989, and assigned to the same assignee as the present invention. In the manufacture of prior art compacts, high temperatures and pressures greater than 50 kbar are required to obtain interparticle bonding and/or conversion of HBN to CBN.

From the foregoing, it can be seen that it would be advantageous to form multigrain compacts at lower temperatures and pressures, particularly since high pressure/high temperature apparatus represent significant capital equipment expense and their use requires a significant expenditure of energy.

It is well known in the art that metal coatings on abrasive particles such as diamond and cubic boron nitride improve the retention of such particles in the matrices of abrasive tools such as grinding wheels and similar agglomerated aggregates. For example, it is preferable to use a nickel coating on diamond and cubic boron nitride particles to improve their retention within a resin matrix of a grinding wheel. In copending U.S. patent application Ser. No. 07/365,883, a coating to prevent oxidation is used on the HBN particles which is said to help bond the particulates. However, until now, coated granules have not been used to provide abrasive compacts under relatively mild process conditions.

SUMMARY OF THE INVENTION

Accordingly, it is an object of this invention to provide an improved process for making multigrain abrasive compacts from fine cubic boron nitride and diamond granules and the articles made therefrom.

It is another object of the present invention to provide multigrain CBN and diamond compacts having controlled breakdown characteristics.

Another object of the present invention is to provide multigrain abrasive compacts and composite compacts at reduced temperatures and pressures, preferably without the use of a high pressure, high temperature apparatus.

It is a further object of the present invention to provide multigrain abrasive compacts and composite compacts without the use of a high pressure, high temperature apparatus.

It is another object of the present invention to provide multigrain abrasive compacts and composite compacts obtained from fine abrasive granules having a strongly-adherent sinterable coating that acts as an interparticle bonding medium when sintered.

Other objects will be apparent from the detailed description and claims which follow.

These and other objects are achieved by a process wherein fine abrasive granules of cubic boron nitride or diamond are coated with at least one layer of an active coating material which chemically bonds to the underlying surface. The outer layer on the fine granules of cubic boron nitride or diamond is sinterable and these coated granules are sintered to provide a multigrain abrasive compact at pressures below 50 kbar and temperatures below 1500° C., in a period of less than 10 minutes.

Embodiments of this method include processes for preparing composite compacts wherein the coated granules are sintered on a substrate. Further embodiments of the methods provided by this include processes wherein the resulting breakdown characteristics of the multigrain abrasive compact is controlled by means of selecting the particle size of the fine abrasive granules, the coating material to be applied and the thickness of the coating material on the fine abrasive granule.

The multigrain abrasive compacts produced by the processes of this invention and tools which incorporate such compacts are also provided.

DETAILED DESCRIPTION OF THE INVENTION

The fine abrasive granules of cubic boron nitride or diamond utilized in the process of this invention can be of any size. These fine granules can have a diameter which is submicron in size or they can be as large as 1000 micron in diameter. Preferably, these granules are of a size within the range of 0.25 micron to about 200 micron. Coatings on such granules will not dilute the abrasive materials excessively so as to hinder the performance of the resultant compacts made therefrom. The fine cubic boron nitride abrasive granules used in this invention are those obtained from hexagonal boron nitride either with or without a catalyst, such as described in U.S. Pat. Nos. 4,289,503, 2,947,617, 4,188,194 and 3,212,852. This includes those granules obtained from pyrolytic boron nitride and graphitic boron nitride. Included within the term "cubic boron nitride", are the nitrides having the Wurtzitic structure (WCN), which is a compact hexagonal structure.

Of the diamond materials, both synthetic and natural diamonds are suitable. The diamond powders obtained from chemical vapor deposition are also suitable. The particles can either be monocrystalline, obtained with a catalyst, or they can be polycrystalline obtained without a catalyst by direct conversion. Pyrolytic boron nitride is commonly used to form CBN granules in that the higher energy state of the CBN structure reduces the energy barrier necessary to convert to polycrystalline CBN. This allows direct conversion without the need of a catalyst or conversion aids. It is preferable to utilize granules of a size directly obtained from a conversion process. However, the granules utilized in the present invention can be obtained from larger size materials which are milled or pulverized by conventional techniques to a desired size.

Although not critical, it is preferable for the granules to be subjected to a pretreatment process such as vacuum heating or firing to remove volatile impurities, particularly surface oxide contaminants such as boron oxide in the case of CBN granules. Although it is not practical to remove all of the oxide and/or other volatile impurities from the CBN granules or diamond granules, a sufficient amount of the oxide or other volatile components should be removed to provide good adhesion of the first layer of active coating material. The phrase "substantially oxide-free" refers to CBN or diamond granules having a reduced amount of oxide and/or other volatile contaminants so that the subsequent coatings can be integrally bonded thereto. Generally, in preferred embodiments of the present invention, up to about 90% and more preferably, from 90–98% by weight of the oxides and other volatile contaminants are removed from the CBN or diamond granules in the pretreatment step.

Prior to vacuum firing, CBN or diamond granules may be treated to remove residual metals or organics on the surfaces thereof. This can be accomplished by conventional techniques such as with an acid wash, followed by a deionized water wash and subsequent drying of the granules. The amount of residual metallics or organics removed is not critical, provided that the surface of the fine abrasive granules will provide good adhesion to a subsequent coating.

An active coating material is then applied to the fine granules of cubic boron nitride or diamond. This active coating material chemically bonds to the underlying surface such as, for example, in the case of the initial layer, the surface of the abrasive particles. Subsequent layers of active material bond to the underlying layer. The outer layer of active coating material on the granules must be sinterable so as to provide for interparticle bonding and formation of the compact, preferably under relatively mild sintering conditions.

The first layer of active coating material is preferably applied in the same device used to remove the oxide or other volatile contaminants from the granules. The vacuum furnace utilized in CVD processes can remove the oxide and volatile contaminants from the surfaces of the abrasive granules prior to coating with the active coating material. Pretreatment which removes oxides and/or other volatile contaminants from the surface of the CBN or diamond granules can be also carried out in a low pressure chemical vapor deposition chamber. Removing the oxides from the surface of a CBN or diamond by such a technique is described in greater detail in U.S. Pat. No. 4,289,503. The process is not limited to such a device however.

Alternative methods for applying a layer of active coating material include other vacuum deposition processes, electrolytic deposition processes and electroless deposition processes.

One skilled in the art will be able to determine the process and conditions necessary for forming a particular coating in a manner in which the material chemically bonds with the underlying surface.

The active coating material may be any metal or alloy which chemically bonds to the surface of the abrasive granules or a coating thereon when applied. Preferred metals include titanium, zirconium, hafnium, vanadium, niobium, tantalum, chromium, molybdenum, tungsten, nickel, copper, cobalt, silicon and the like, or mixtures thereof. The borides, nitrides and carbides and oxides of these various metals are also suitable. Particularly preferred active coating materials are titanium carbide and titanium nitride and nickel.

The thickness and/or the amount of coating agent capable of forming the compact mass is not critical. It is preferred that the entire surface of the abrasive granule be coated with the active curing agent. Submicron thicknesses, i.e., less than 0.01 mm, are suitable. However, in controlling the resulting particle breakdown characteristics, it may be desirable to increase the thickness of the coating. In most cases, the greater the thickness of the coating, the less the interparticle bonding strength between the granules. The maximum thickness of the active coating material is that wherein there is a substantial dilution of the abrasive granules wherein the resulting compact is no longer effective in abrasive or cutting tools.

Preferably, the coating thickness ranges from about 0.01 to 5.0 micron and more preferably from about 0.1 to 1.0 micron. One skilled in the art can determine suitable and preferred active coating materials, granule sizes and total coating thicknesses for the end use intended by routine investigation. A coating thickness which provides up to 50% by weight active coating material, based on the weight of the compact, is acceptable.

The conditions required for coating the CBN or diamond granules with an active coating material vary with the method used for applying the coating and with the type of coating applied, for example, as to whether the coating is a metal, metal boride, a metal carbide or a metal nitride. Conditions will also vary with the type of coating process, whether it is electroless deposition, electrolytic deposition, vacuum deposition or chemical vapor deposition. The conditions for coating the fine abrasive granules are not critical and any technique known in the art for applying the coating may be used in the present invention. Those skilled in the art will recognize the desired and preferred process conditions.

One method of coating substantially oxide-free CBN particles with a metal coating is described in U.S. Pat. No. 4,399,167, incorporated herein by reference. After removal of oxides and other volatile contaminants, a mass of metal in powder form is mixed with the CBN granules and the mixture is heat-treated at a temperature below the melting point of the metal to deposit a layer of metal on the particles. The heat treatment takes place in a non-oxidizing atmosphere. There is minimal sintering of the metal during the deposit of the metal on the surface due to the low temperature. As a general rule, the heat treatment is less than 60 minutes and the coating thickness does not exceed a few microns as is typically less than about 5 micron and preferably from 0.5 to 1 micron coated CBN or diamond. Of the metal powders, titanium, zirconium, niobium and mixtures thereof, having a particle size of from about 125 to 37 micron are preferred.

The outer layer of active coating material on the fine abrasive granules of cubic boron nitride or diamond is sinterable. This sinterable material can be the only coating applied to the fine granules or it can be one of many separate layers. This sinterable coating can be applied by the same techniques as those given above for the active coating materials, i.e., by electroless deposition, electrolytic deposition; vacuum deposition and chemical vapor deposition techniques. Suitable sinterable materials include nickel, cobalt, copper and the borides, nitrides and carbides of titanium, tantalum, molybdenum, zirconium, hafnium, tungsten, vanadium, chromium, niobium, and silicon.

In preferred embodiments, the abrasive granules are coated with active coating materials by chemical vapor deposition (CVD) and more preferably by low pressure chemical vapor deposition (LPCVD) techniques. Such methods are well known in the art, particularly for metal carbides, borides, nitrides and oxides, particularly for the preferred metals referred to above, especially titanium. Titanium carbide coatings are derived from titanium tetrachloride and methane gas, with a hydrogen gas, by chemical vapor deposition at reduced pressure and an elevated temperature (LPCVD). Titanium nitride is derived from a nitrogen gas and titanium tetrachloride maintained at the temperature and pressure sufficient to form titanium nitride on the granules during CVD processing. Titanium nitride coatings can also be obtained wherein the nitride is derived from the boron nitride on the surface of the CBN granules. Chemical vapor deposition and low pressure chemical vapor deposition processes, systems and devices are described in *Kirk-Othmer Encyclopedia of Chemical Technology*, Vol. 15, pp. 262-264 (1981).

Electrolytic and electroless deposition techniques and systems are also suitable and are described by *Kirk-Othmer Encyclopedia of Chemical Technology*, Vol. 15, pp. 241-274 (1981).

After the abrasive granules are coated with at least one active coating material and have a sinterable outer coating, they may be stored for subsequent use or they may be used immediately by a sintering process to form a multigrain abrasive compact in accordance with this invention. These granules are then bonded together by the sinterable outer coating of active material. Alternatively, these coated granules can be mixed with a powdered metal or alloy and sintered to provide an abrasive compact in accordance with the present invention.

Sintering of the coated particles can take place by conventional techniques. Pressures below 50 kbar are suitable. Preferably, pressures below 35 kbar are used and most preferably about 2000 psi with temperatures about 1500° C. Sintering can take place in a high pressure, high temperature apparatus. The cycle time within this equipment is short in duration, i.e., less than 10 minutes. The conditions required are less extreme than those used to form self-bonded compacts or those which utilize a metal bonding agent. Preferably, the sintering is performed in less than 5 minutes, although duration of the sintering process is not critical to this invention. Most preferably, sintering takes place in less than about 3 minutes. The shorter the cycle times, the more economical and efficient the process. Preferred temperatures and pressures vary with the coatings on the fine abrasive granules. Coating materials can be selected so that high pressure, high temperature equipment is not needed to sinter the coated granules. For example, titanium carbide, nickel and nickel alloys can be sintered at pressures below 5 kbar, which do not require such a device. Those skilled in the art will recognize the appropriate sintering temperatures for the coating selected and the appropriate pressures necessary. Generally, temperatures in the range of 750° C. to 2000° C. are adequate with pressures ranging from 0.1 to 50 kbar.

The multigrain abrasive compacts of this invention can be of any form or shape desired, which is determined by the die and press utilized to sinter the coated particles. Preferably, the abrasive compacts are of a shape which can easily be converted to useful components for cutting tools and abrasive tools. Most preferably, the abrasive compacts of this invention can be used directly with such tools without need for modifying their shape. The abrasive compacts of this invention are typically brazed onto the cutting surfaces of tools such as saw blades and drill bits. These tools will have improved wear and breakdown characteristics in use as provided by the multigrain abrasive particles incorporated therein. To further control the breakdown characteristics, a sinterable powder of a metal or alloy can be introduced with the coated particles to contribute to the matrix of the resulting compact mass. The ratio of sinterable powder to coated particles can range from 10:1 to 0.1:1 powder to particles, on a weight basis.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth in degrees Celsius and unless otherwise indicated, all parts and percentages are by weight.

The entire disclosures of all applications, patents and publications, cited above and below, are hereby incorporated by reference.

EXAMPLE

Example 1

About 50 g of 18/20 mesh Cubic boron nitride 550 is inserted into a low pressure chemical vapor deposition apparatus. The system is evacuated below 1 Torr and then scrubbed by flowing hydrogen gas through the system. While under vacuum, the temperature of the CBN is raised to about 1000° C. to remove boron oxides and other volatile contaminants prior to coating. The particles are coated with titanium carbide by flowing a hydrogen stream, a methane gas stream and a stream of a titanium tetrachloride and hydrogen mixture through the system for approximately 2 hours at 1000° C. and about 10 Torr. The flow rate for the titanium tetrachloride, total hydrogen and methane gases is 100 SCCM, 600 SCCM and 300 SCCM, respectively. After cooling under vacuum, the CBN particles are removed from the apparatus and inspected for a gray-black appearance which indicates a titanium carbide coating of the particles has been obtained. This can be confirmed by X-ray diffraction techniques.

A sample of the 18/20 mesh CBN coated with titanium carbide is then overcoated with nickel to about 30 micron thickness by electroplating in a bath of WATTS solution (Ni sulfate/Ni chloride) for 1200 amp-minutes.

An abrasive compact is prepared by sintering a 50/50 mixture of titanium carbide/nickel coated 18/20 mesh CBN 550 and a matrix alloy "424" (iron, copper, tungsten, nickel alloy) in a hot press apparatus where the temperature is about 950° C. and the pressure is about 2000 psi. The 50/50 mixture is on a weight basis.

Example 2

About 50 g of 40/50 mesh CBN 550 is successfully coated with titanium carbide to about 0.4 micron thickness by low pressure chemical vapor deposition utilizing the equipment and procedure described in Example 1. Successful coating is evidenced by a gray/black color on the CBN particles.

An abrasive compact is successfully prepared from the titanium carbide coated CBN 550 utilizing a high pressure, high temperature apparatus. The pressing time is less than 10 minutes. The temperature is about 1500° C. and the pressure is about 50 Kbar for a time of 4 minutes at temperature.

Example 3

About 20.5 g of 270/325 mesh CBN 550 is coated with titanium carbide by low pressure chemical vapor deposition utilizing the equipment and procedure described in Example 1 except that the flow rates for the hydrogen stream, the methane stream and the titanium tetrachloride/hydrogen stream are each 300 SCCM, respectively. Successful coating is evidenced by a gray/black color of the CBN particles after coating.

Samples of the titanium carbide coated cubic boron nitride granules are successfully sintered into a compact mass in a high pressure, high temperature apparatus at a pressure of about 50 Kbar and temperature of about 1500° C., for a period of less than 10 minutes.

The preceding examples can be repeated with similar success by substituting the generically or specifically described granules, reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the preparation of a multigrain abrasive compact which comprises applying to fine granules of cubic boron nitride or diamond at least one layer of an active coating material which chemically bonds to the underlying surface, wherein the outer layer of active coating material is sinterable, and sintering the coated granules to provide a multigrain compact mass.

2. A process as in claim 1, wherein from 1 to 3 layers of active coating material are applied to the fine granules by chemical vapor deposition, electroless deposition and/or electrolytic deposition.

3. A process as in claim 1, wherein the coated granules are sintered with a sinterable powder at a weight ratio of 10:1 to 0.1:1 sinterable powder to granules.

4. A process as in claim 1, wherein at least one layer of active coating material is titanium, zirconium, hafnium, vanadium, niobium, tantalum, chromium, molybdenum, nickel, cobalt, silicon, copper, tungsten or a carbide, boride, nitride or oxide thereof.

5. A process as in claim 1, wherein one layer of active coating material is titanium nitride or titanium carbide applied by chemical vapor deposition and the outer layer of active coating material is nickel, applied by electrolytic deposition.

6. A process as in claim 1, wherein the sinterable outer coating of active coating material is nickel, cobalt, copper, or a carbide, nitride or boride of titanium, tantalum, molybdenum, zirconium, vanadium, chromium, niobium, hafnium, tungsten, or silicon.

7. A process as in claim 1, wherein the sinterable outer coating of active coating material is selected so as to permit sintering at temperatures below 1000° C. and pressures below 2000 psi for a period less than 10 minutes.

8. A process as in claim wherein the fine granules of cubic boron nitride or diamond are of a diameter within the range of 0.1 to 1000 micron.

9. A process as in claim 1, wherein the active coating material is applied to the fine granules at a total thickness of about 0.01 to 5.0 micron.

10. A process as in claim 3, wherein the sinterable powder is nickel, cobalt, tungsten, tungsten carbide, copper or an alloy thereof.

11. A process as in claim 1, wherein the granules of cubic boron nitride or diamond are sintered without the use of a catalyst at a pressure in the range of 0.1 to 50 kbar and a temperature below 2000° C. for a period of less than 5 minutes.

12. A process for preparing a multigrain abrasive compact having controlled breakdown characteristics which comprises selecting fine granules of cubic boron nitride or diamond of a diameter within the range of 0.1 to 200 micron, applying at least two layers of active coating material selected from titanium, zirconium, hafnium, tungsten, vanadium, niobium, tantalum, chromium, molybdenum, silicon, or a carbide, bromide, nitride or oxide thereof, at a total thickness in the range of 0.1 to 1.0 micron, wherein the outer layer is a sinterable material selected from nickel, copper, cobalt, or a carbide, nitride or boride of titanium, tantalum, molybdenum, zirconium, hafnium, vanadium, chromium, tungsten, silicon, or niobium; sintering the coated granules at a temperature about 1000° C. at a pressure about 2000 psi for a period less than 5 minutes to provide a multigrain abrasive compact.

13. A multigrain abrasive compact which comprises cubic boron nitride or diamond granules bonded together in a sintered matrix derived from a coating on the granules which comprises one or more layers of active coating material chemically bonded to the underlying surface of the granules.

14. A multigrain abrasive compact as in claim 13, wherein 1-3 layers of active coating material are applied to the granules by chemical vapor deposition, electrolytic deposition and/or electroless deposition.

15. A multigrain abrasive compact as in claim 13, wherein at least one layer of active coating material is titanium, zirconium, hafnium, vanadium, niobium, tantalum, chromium, molybdenum, tungsten, silicon or a carbide, boride, nitride or oxide thereof and the sinterable outer layer is nickel, copper, cobalt, or a carbide, boride or nitride of titanium, tantalum, molybdenum, zirconium, vanadium, hafnium, chromium, silicon, tungsten, or niobium and the total thickness of active coating material is from 0.01 to 5.0 micron.

16. A multigrain abrasive compact which comprises cubic boron nitride granules bonded together in a sintered matrix derived from a titanium carbide coating on the granules applied by chemical vapor deposition.

17. An abrasive tool which includes as a component a multigrain abrasive compact of claim 13.

18. A multigrain abrasive compact which comprises diamond powder produced together in chemical vapor deposition which is bonded by a sintered matrix derived from a coating on the powder applied by chemical vapor deposition, wherein the coating comprises a carbide, boride or nitride of titanium, tantalum, molybdenum, zirconium, hafnium, vanadium, chromium, niobium, tungsten, or silicon.

19. A process for the preparation of a multigrain, polycrystalline abrasive compact, which comprises:

applying to fine polycrystalline granules of cubic boron nitride or diamond at least one layer of an active coating material which chemically bonds to the underlying surface, wherein the outer layer of active coating material is sinterable, and sintering the coated granules to provide a multigrain, polycrystalline abrasive compact mass.

20. A multigrain, polycrystalline abrasive compact mass which comprises polycrystalline cubic boron nitride or diamond abrasive granules bonded together in a sintered matrix derived form a coating on the granules which comprises one or more layers of active coating material chemically bonded to the polycrystalline abrasive granules.

* * * * *